W. T. BENHAM.
PERMUTATION LOCK DIAL.
APPLICATION FILED JAN. 28, 1913.
1,113,865.
Patented Oct. 13, 1914.
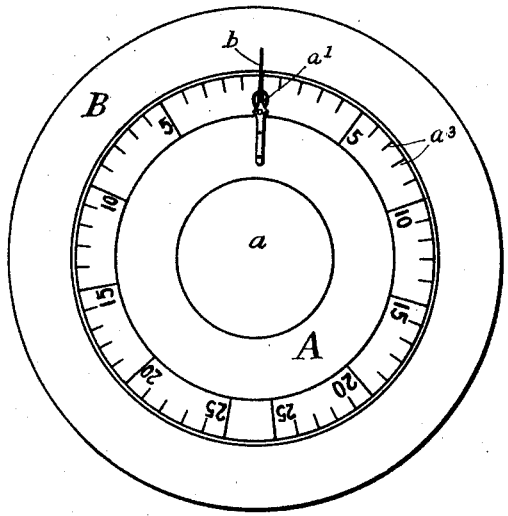
WITNESSES:
Lewis M. Hosea
A. L. Tildesley
INVENTOR.
William T. Benham
BY
Walter A. Knight
ATTORNEY.
THE NORRIS PETERS CO., PHOTO-LITHO., WASHINGTON, D. C.

UNITED STATES PATENT OFFICE.

WILLIAM T. BENHAM, OF RISING SUN, INDIANA.

PERMUTATION-LOCK DIAL.

1,113,865.  Specification of Letters Patent.  Patented Oct. 13, 1914.

Application filed January 28, 1913. Serial No. 744,606.

*To all whom it may concern:*

Be it known that I, WILLIAM T. BENHAM, a citizen of the United States, residing at Rising Sun, in the county of Ohio and State of Indiana, have invented new and useful Improvements in Permutation-Lock Dials, of which the following is a specification.

My invention relates to the class of locks embodying a rotating dial such as are commonly used on safes. By the common practice universally in vogue among manufacturers of safe locks of this character, so far as I am aware, the dial numbering of the equal fractional units of rotation is from left to right for the entire rotation. As applied to combination locks of the ordinary type, in "running the combination" to place the tumblers or guards in position to permit the unlocking of the safe, it is necessary in the making the right and left movements of the dial, to keep the "passing numbers" in mind with absolute accuracy in connection with changes in the requirements of direction and number of revolutions in each case, besides exercising extra care in manipulations to avoid passing the proper coincidence of passing-number points with the gage mark. All this renders the matter complicated to the ordinary user and results in frequent failures and loss of time. By my improvement the manipulations are much simplified since the passing point is always the same—thereby avoiding a useless tax upon the memory and attention and the dial reading is always with and not contrary to the succession of numbers; so that the entire operation is more in accord with natural mental action and therefore more easily comprehended and more speedily and certainly performed.

To this end my invention consists in the combination and use, in a dial lock of this character, of a rotating dial-plate numbered in successive fractional rotations both to right and left of a common starting point which may be designated as zero and represented by the cipher mark;—the total numbering in each direction occupying half a rotation while entire rotations are marked by the coincidence of the zero point with a single gage mark upon the fixed annular rim surrounding the dial.

My invention is represented in the drawing accompanying and forming part of this specification, by the figure of a dial plate with radial marks indicating fractional rotations up to twenty-five in both directions from the same starting point.

Referring now to said drawing, A designates the rotating dial plate; B its surrounding fixed annulus; and $a$ the usual central knob. For greater convenience, a pointer $a^1$ may be attached to the dial at the zero point, projecting slightly over the annulus to mark with greater certainty of observation the coincidence with the single gage mark $b$ upon the annulus B. The marks $a^3$ upon the dial extend radially slightly inward from the periphery and indicate successive equal movements of rotation right and left from the zero point; and each successive fifth mark is somewhat prolonged toward the center of the dial and designated by numbers 5, 10, 15, etc., to 25—this last being at or within the diametrical line from the zero point. In the present illustration I have shown the series of numbers at each side as terminating a trifle short of this diameter, leaving a neutral segment between so that each series is entirely independent in its numbering— an incidental feature which adds in a slight degree to certainty of manipulation.

The operation of the dial is as follows— to take a concrete example as operated by the dial commonly in use and contrasting it with the operation of the dial herein shown and described:

*The old.*—Turn right 3 times and stop at 20. Turn left twice passing 20 and stop at 30. Turn right once passing 30 and stop at 10. This involves: first, three entire revolutions to the right past zero from the point of beginning (whatever it may happen to be) and continuing on until the 20 mark coincides with the gage mark of the annulus; second, two entire revolutions backward from 20 as a starting and ending point, continuing on until 30 coincides with the gage mark of the annulus; third, one complete revolution to the right from 30 as a starting and ending point, and continuing on until 10 is reached. In this, the first operation after the completed entire revolutions involves a reading of the dial marks backward in succession until 20 is reached; in the second operation this number must be kept in mind as the basis of complete rotations and then reading the dial marks forward in succession until a new number—30—is reached, which in turn displaces the former number—20—and becomes, as in the former case, a basis for the final complete rotations.

To operate the same combination by my improvement it is only necessary to remember that all rotations refer to the coincidence of the zero mark on the dial with the gage mark of the annulus; so that whatever be the starting point, a given number of rotations means simply the passing coincidence of zero and gage marks a given number of times. The zero point being preferably always at the zenith point of the dial and marked in some emphatic manner—as in the present illustration by a pointer,—this much of the manipulation soon becomes instinctive. Also, that as the dial readings in either direction are always in forward succession of numbers from this common starting point—zero—and never backward and never from the previously-reached point in the dial numbering, the matter of the adjustment to special numbers on the dial is rendered simple and certain. Thus the operation of the same combination, described in terms of my improvement would be:

*The new.*—Turn right, pass 0, 3 times, continue to 20 (right hand). Turn left, pass 0, twice, continue to 20 (left hand). Turn right, pass 0, once, continue to 10 (right hand).

I claim as my invention and desire to secure by Letters Patent of the United States:

In a dial lock of the character indicated, the combination of a rotatable dial plate having its outer circumferential space marked in equal fractional divisions of rotation numbered in forward succession in both directions from a common starting point through or approximately through half a rotation in each case, in combination with a relatively fixed part of the structure having a single gage mark adjacent to the edge of the dial to mark entire or partial rotations of the latter by coincidence of dial marks with said fixed gage mark.

In testimony whereof I have hereunto set my hand in presence of two subscribing witnesses.

WILLIAM T. BENHAM.

Witnesses:
  LEWIS M. HOSEA,
  ALICE L. TILDESLEY.